(12) United States Patent
Megariotis et al.

(10) Patent No.: US 12,475,609 B2
(45) Date of Patent: Nov. 18, 2025

(54) SYSTEMS AND METHODS FOR GENERATING AND DISPLAYING VIRTUAL MANUFACTURING ENVIRONMENTS

(71) Applicant: Toyota Motor North America, Inc., Plano, TX (US)

(72) Inventors: Nick Anthony Megariotis, Irvine, CA (US); Roger Akira Kyle, Aubrey, TX (US); Timothy Wang, Ann Arbor, MI (US); Justin K. Shen, Canton, MI (US); Imad Zahid, Carrollton, TX (US)

(73) Assignees: TOYOTA MOTOR NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 18/339,769

(22) Filed: Jun. 22, 2023

(65) Prior Publication Data

US 2024/0428471 A1 Dec. 26, 2024

(51) Int. Cl.
*G06F 3/01* (2006.01)
*G06F 1/16* (2006.01)
*G06Q 30/016* (2023.01)
*G06Q 50/04* (2012.01)
*G06T 11/00* (2006.01)

(52) U.S. Cl.
CPC ............ *G06T 11/00* (2013.01); *G06F 1/163* (2013.01); *G06F 3/011* (2013.01); *G06Q 30/016* (2013.01); *G06Q 50/04* (2013.01)

(58) Field of Classification Search
None
See application file for complete search history.

(56) References Cited

U.S. PATENT DOCUMENTS

| 11,103,773 | B2 | 8/2021 | Rathod |
| 2011/0029889 | A1 | 2/2011 | Karstens |
| 2013/0257686 | A1* | 10/2013 | Baron ................ G06F 3/04815 345/2.2 |

(Continued)

FOREIGN PATENT DOCUMENTS

| DE | 102017219067 A1 * | 4/2019 | ............ G06F 1/163 |
| KR | 2021154914 A | 12/2021 | |

OTHER PUBLICATIONS

Nissan & Toyota race into the metaverse (https://blockonomi.com/nissan-toyota-race-into-the-metaverse/), Apr. 26, 2022.

(Continued)

*Primary Examiner* — Christopher J Fibbi
(74) *Attorney, Agent, or Firm* — DINSMORE & SHOHL LLP

(57) ABSTRACT

Systems and methods for generating and displaying virtual vehicle manufacturing environments are disclosed. In one embodiment, a method of presenting a virtual manufacturing environment includes receiving a vehicle identification number of a vehicle being manufactured, receiving one or more parts assigned to the vehicle, determining a stage of manufacturing for the vehicle based at least in part on the one or more parts, generating a virtual representation of the vehicle in a virtual manufacturing environment, and preparing for display the virtual representation of the vehicle and the virtual manufacturing environment.

15 Claims, 7 Drawing Sheets

(56) References Cited

U.S. PATENT DOCUMENTS

| | | | |
|---|---|---|---|
| 2017/0169524 A1* | 6/2017 | O'Connor | G06Q 50/04 |
| 2020/0388073 A1 | 12/2020 | Mall | |
| 2021/0172882 A1* | 6/2021 | Arboleda | G01N 21/8851 |
| 2022/0194502 A1* | 6/2022 | Takahashi | G01N 21/84 |
| 2024/0192657 A1* | 6/2024 | El-Qawasmeh | G05B 19/41805 |
| 2024/0378878 A1* | 11/2024 | Southin | G06N 20/00 |
| 2024/0403945 A1* | 12/2024 | Kim | G06Q 30/0643 |

OTHER PUBLICATIONS

Acura shows us how to use the metaverse and NFTs to sell cars, raise awareness (https://martech.org/how-to-use-the-metaverse-and-nfts-to-sell-products-and-raise-awareness-among-new-customers/) Mar. 23, 2022.

Hyundai's metaverse merges the real and digital worlds in one (https://www.motortrend.com/events/hyundai-metaverse-merges-real-digital-worlds-one-robotics/) Apr. 4, 2022.

* cited by examiner

SYSTEMS AND METHODS FOR GENERATING AND DISPLAYING VIRTUAL MANUFACTURING ENVIRONMENTS

TECHNICAL FIELD

The present specification relates to virtual environments and more particularly, to virtual manufacturing environments.

BACKGROUND

Presently, a person who orders a vehicle that has not yet entered into production is in the dark as to when the vehicle will be built, or at what stage the vehicle is at during production. The person may be required to frequently call the vehicle dealership for more information, which may or not be available. This can lead to frustration as the person is most likely excited and anxious to take possession of the new vehicle.

Accordingly, alternative systems and methods for providing a user with information relating to production of a vehicle may be desired.

SUMMARY

In one embodiment, a method of presenting a virtual manufacturing environment includes receiving a vehicle identification number of a vehicle being manufactured, receiving one or more parts assigned to the vehicle, determining a stage of manufacturing for the vehicle based at least in part on the one or more parts, generating a virtual representation of the vehicle in a virtual manufacturing environment, and preparing for display the virtual representation of the vehicle and the virtual manufacturing environment.

In another embodiment, a system for presenting a virtual manufacturing environment includes one or more processors, and a non-transitory computer-readable medium storing instructions that, when executed by the one or more processors, causes the one or more processors to receive a vehicle identification number of a vehicle being manufactured, receive one or more parts assigned to the vehicle, determine a stage of manufacturing for the vehicle based at least in part on the one or more parts, generate a virtual representation of the vehicle in a virtual manufacturing environment, and prepare for display the virtual representation of the vehicle and the virtual manufacturing environment.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to systems and methods for presenting a virtual environment in which a user can watch and experience the manufacturing of an object, such as a vehicle. The progress of the manufacturing of a particular vehicle is monitored and reproduced in the virtual environment. The user can learn more about his or her vehicle, as well as the manufacturing process, including what steps had previously been taken and what steps are to follow. The virtual environment can allow a user to be immersed in the manufacturing environment in an enjoyable way. For example, a user may use a virtual reality headset to experience the virtual environment.

The user can interact with a virtual or real life personnel within the virtual environment. To learn more about the vehicle under production as well as facts about the manufacturing process. In some embodiments, the user can communicate with the team members that are building the vehicle. For example, the user can provide complements the various team members to show his or her appreciation.

Various embodiments of systems and methods for generating and presenting a virtual manufacturing environment are described in detail below.

Figure 1:
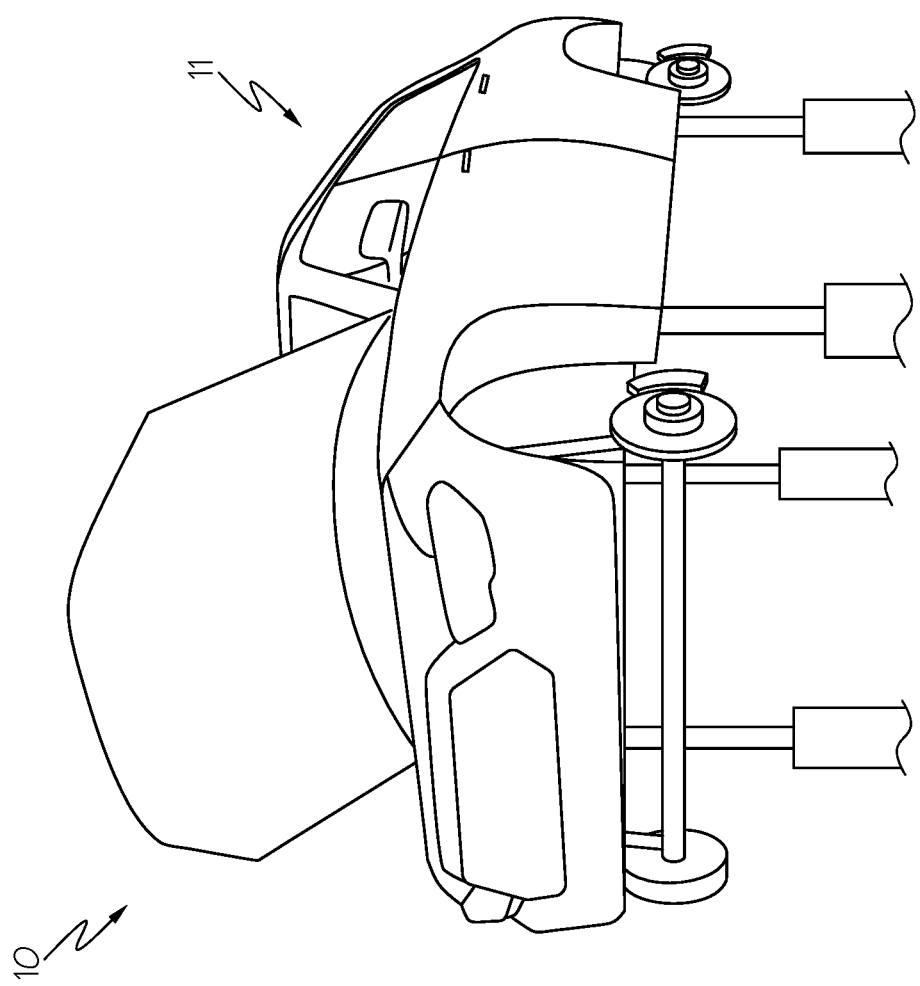
FIG. 1 illustrates an example vehicle manufacturing environment and a vehicle under production according to one or more embodiments described and illustrated herein.

Referring now to FIG. 1, a vehicle 11 being built in a manufacturing environment 10 is illustrated. The manufacturing environment may be a production line that starts with metal stamping, continues through assembly, and ends with roll-off where the vehicle exits the production line. The stage of the vehicle 11 in FIG. 1 is the assembly of the engine in the vehicle. There are many components and systems that are installed in the vehicle as it rolls along the assembly line.

Embodiments of the present disclosure generate a virtual representation of the manufacturing environment as well as the current production state of the vehicle within the manufacturing environment. This virtual manufacturing environment may be displayed on one or more display devices. Non-limiting examples of display devices include virtual reality headsets, augmented reality glasses, tablet computers, computer monitors, laptops, and the like. Virtual reality headsets may be the best option to experience the virtual manufacturing environments described herein.

Figure 2:
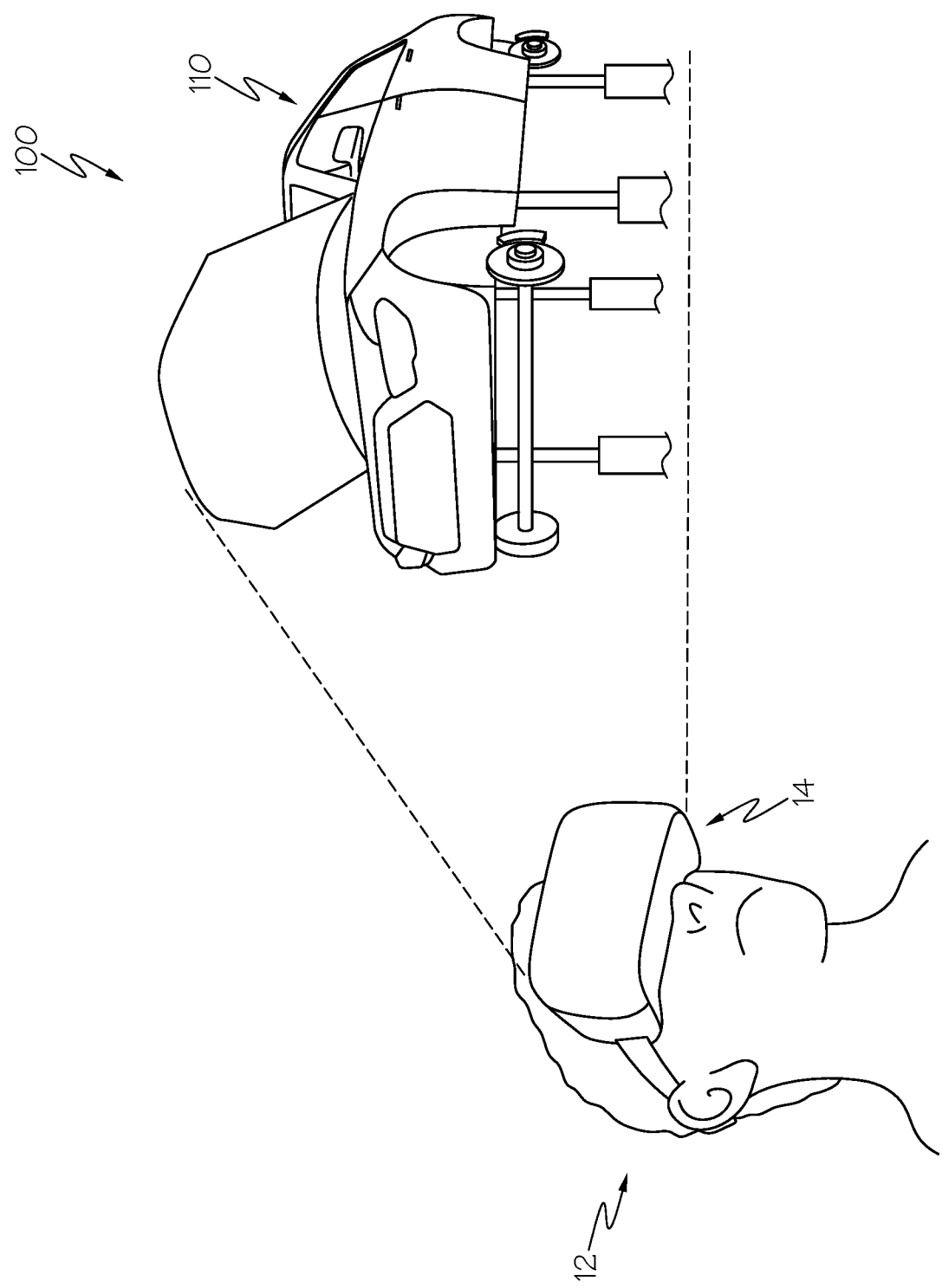
FIG. 2 illustrates a user viewing a virtual vehicle and a virtual vehicle manufacturing environment using a virtual reality headset according to one or more embodiments described and illustrated herein.

Referring now to FIG. 2, a user 12 is wearing a display device configured as a virtual reality headset 14. The virtual reality headset 14 is configured to receive data (either by a wireless connection or a wired connection) representing a virtual manufacturing environment 100, and display the virtual manufacturing environment 100 as well as the a virtual vehicle 110 representing the current state of the actual vehicle 11 in the physical manufacturing environment 10. In this manner, a user can see and understand the manufacturing state of his or her physical vehicle 11 under production.

Figure 3:
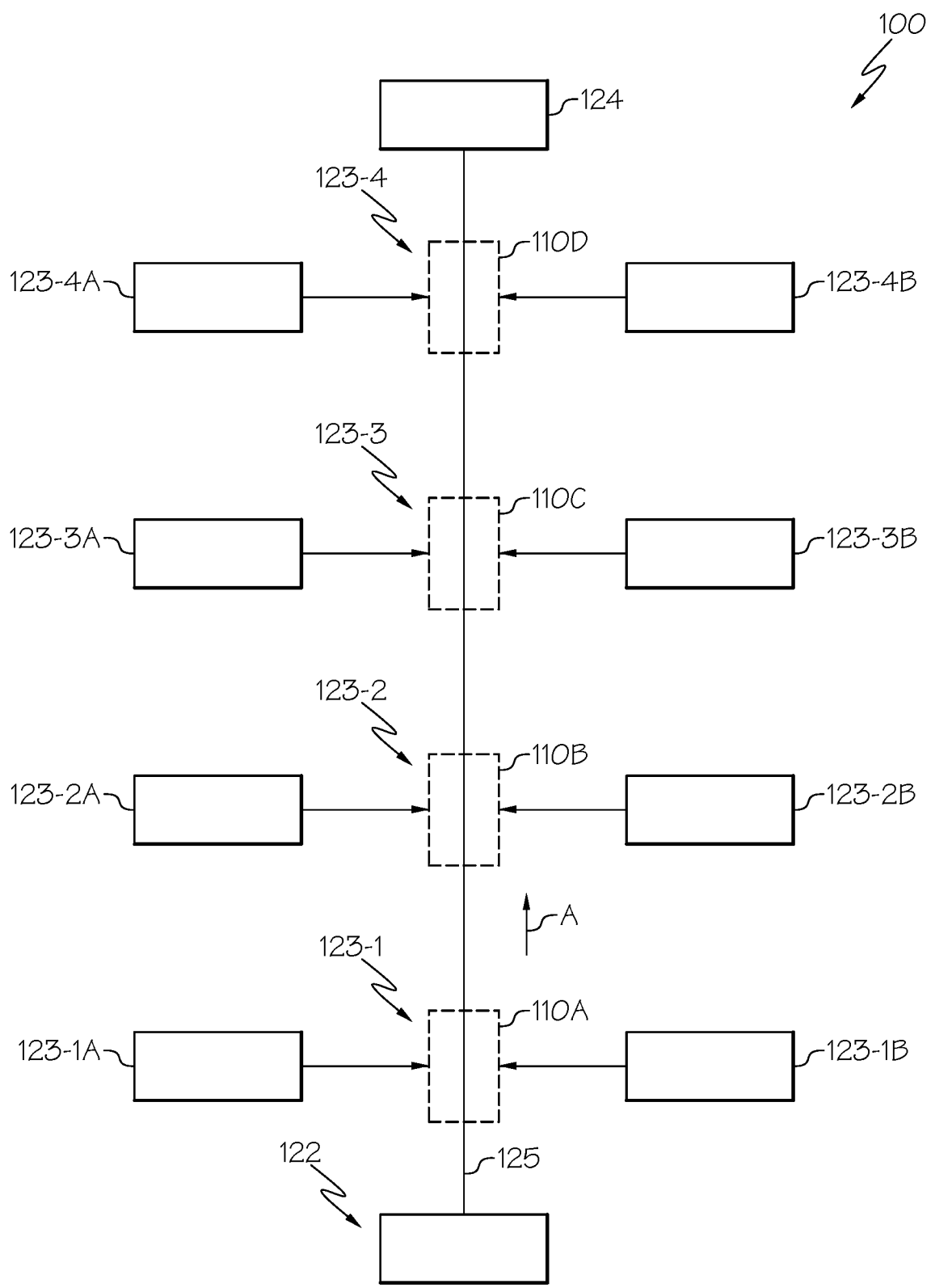
FIG. 3 illustrates an example virtual manufacturing environment according to one or more embodiments described and illustrated herein.

When a vehicle is set to be manufactured, it is assigned a vehicle identification number (VIN). The VIN is associated with an owner of the vehicle. When the owner (the user) received vehicle identification number, he or she may then have access to the manufacturing environment 100. Referring now to FIG. 3, an example overhead view of a virtual manufacturing environment 100 is schematically illustrated. The virtual manufacturing environment 100 has many stages (often referred to as cells) by which tasks are completed on the vehicle as it moves through an assembly line in a direction indicated by arrow A. A VIN may be assigned to the vehicle at block 122. The virtual vehicle (shown as 110A-110D) moves through the various stages of production in a manner that corresponds with the production state of the physical vehicle 11 it represents. FIG. 3 illustrates four stages 123-1 through 123-4; however, it should be understood that there may be many more production stages in an actual assembly line 125. At each stage 123 there may be one or more parts bins (e.g., 123-1A and 123-1B. 123-2A and 123-2B, 123-3A and 123-3B, and 123-4A and 123-4B) that include parts that are to be installed on the vehicle under production. Block 124 represents roll-off where the vehicle is rolled off of the assembly line.

The stage at which the physical vehicle 11 currently occupies is detected automatically. Thus, the stage at which the virtual vehicle 110 is displayed in the virtual manufacturing environment 100 is dynamically updated so that the user can visualize an accurate portrayal of the physical vehicle 11 in its current state. In one embodiment, a code (e.g., a bar code or a QR code) is scanned on a part before it is installed on the physical vehicle 11. In this manner, the specific part numbers installed on a vehicle associated with a particular VIN are known. Using this information, the stage of the physical vehicle 11 can be detected by accessing which parts have been installed. For example, when a code for a quarter panel is scanned and associated with a VIN, the system can determine that the physical vehicle 11 is at a stage associated with quarter panel assembly, or more generally, body assembly.

Other methods of determining the parts and/or part numbers may be used. For example, parts may include a wireless tag or a wireless communication chip (e.g., an RFID tag or NFC chip) that is detected when installed on the physical vehicle 11. The part and part number may be associated with the VIN and stored.

As yet another example, a tracking device (e.g., an NFC device or other wireless device, or a bar code) may be associated with the physical vehicle 11 such that the tracking device is scanned as the physical vehicle 11 moves through the assembly line. In this manner, progress of the production of the physical vehicle 11 can be tracked such that the corresponding virtual vehicle 110 is dynamically updated. The various parts of the physical vehicle 11 may have virtual objects associated therewith, such that a model of the physical vehicle 11 is build using those parts to form the visual representation of the virtual vehicle 110.

The system is configured to allow the user to navigate within the virtual manufacturing environment 100. The user can provide inputs using a user input device that controls the user's avatar through the space (e.g., using virtual reality gloves). For example the user may move to the manufacturing stage that the virtual vehicle 110 occupies. The user can "walk" around (or even "fly" around) the virtual vehicle 110 to see it in its present state. The user can peer into various locations in the virtual vehicle 110 to see interior or hidden parts, for example. The user may also be able to "rewind" the production process and view the virtual vehicle 110 in previous production states, or "fast-forward" to view the future production steps that will be performed on the physical vehicle 11. The user may be able to revisit the virtual manufacturing environment to re-watch his or her vehicle being built well after the vehicle is done being produced.

Figure 4:
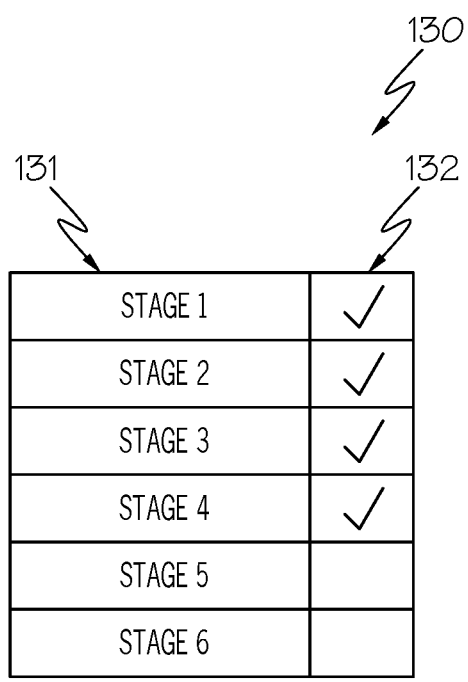
FIG. 4 illustrates an example manufacturing progress indicator according to one or more embodiments described and illustrated herein.
Figure 5:
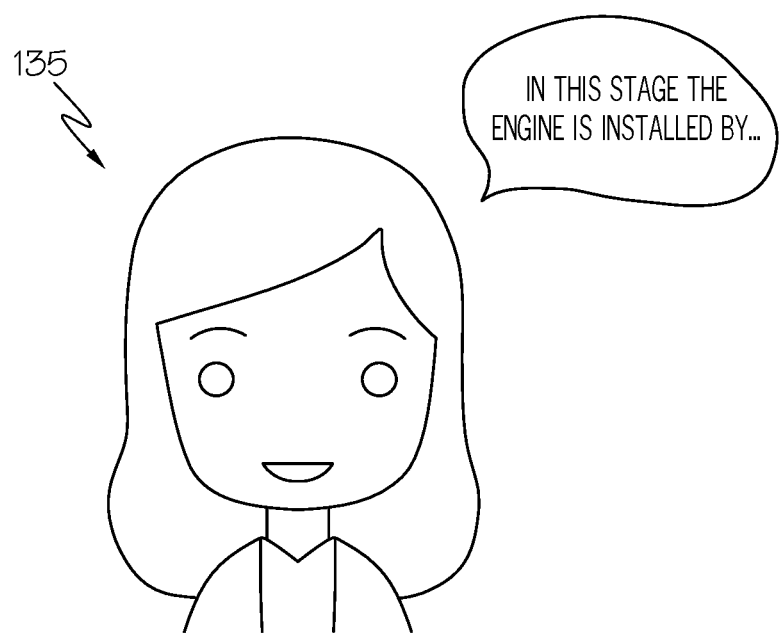
FIG. 5 illustrates an example team member avatar according to one or more embodiments described and illustrated herein.

Additional information about the manufacturing process may also be displayed to the user in various forms. Referring now to FIG. 4, an example manufacturing progress indicator 130 is shown. In this example, various stages are listed in column 131, and a checkmark appears of stages that have been completed. A user can view this manufacturing progress indicator 132 to monitor the status of the production of his or her vehicle. In some embodiments, the manufacturing progress indicator 130 may be used to navigate the user to a particular production stage on the virtual assembly line in the virtual manufacturing environment 100. For example, a user selecting Stage 3 may cause the user to teleport or otherwise move to the third manufacturing stage in the virtual assembly line so that the user can view the virtual vehicle 110 at this stage of production. In another example, a user may select the stage to get additional information about the manufacturing process at the selected stage.

The additional information may be provided to the user in a variety of ways. In one example, an avatar 135 of a team member may appear upon selection of a stage or any other input requesting additional information. The avatar 135 may speak to the user to provide the additional information that is requested. In some embodiments, the avatar 135 is computer-generated and operates similar to a chat bot. In other embodiments, the avatar 135 is controlled by an actual person. The avatar 135 and the user may have a conversation about the production of the vehicle.

Figure 6:
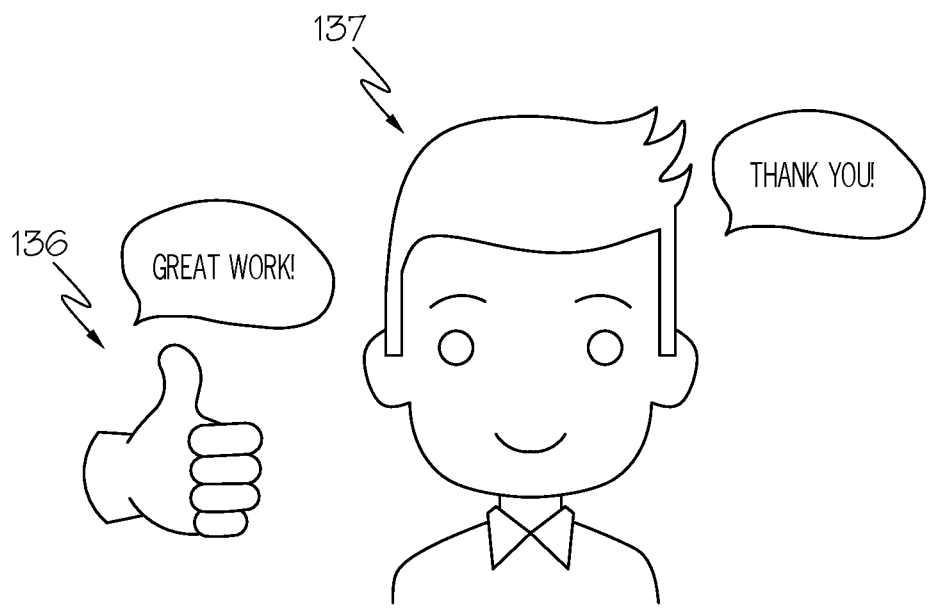
FIG. 6 illustrates a team member receiving feedback according to one or more embodiments described and illustrated herein.

In some embodiments, the user may provide feedback using a feedback option to actual team members who are working hard to assemble the user's vehicle. FIG. 6 illustrates a team 137 receiving positive feedback 136 from a user of the system. This can encourage the team member 137 and cause a feeling of pride in his or her job. The feedback may come to the team member 137 in various forms, such as by text message, email, production facility message board, and in performance reviews. In some embodiments, a team member may use the system to enter the virtual manufacturing environment and correspond directly with the user by way of an avatar. This way, the user can have an engaging conversation with various people who have produced his or her car.

Figure 7:
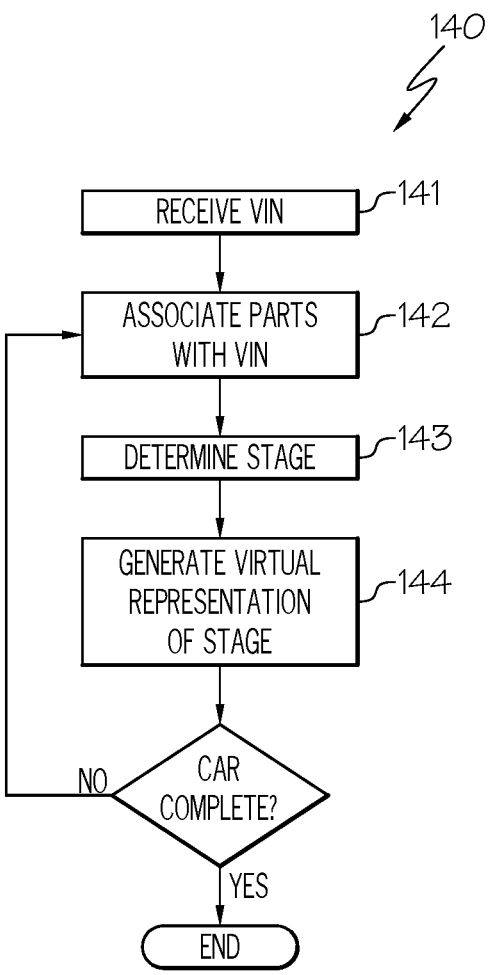
FIG. 7 is a flowchart showing an example method of generating and presenting a virtual manufacturing environment according to one or more embodiments described and illustrated herein.

FIG. 7 illustrates an example method 140 of generating and displaying a virtual vehicle within a virtual manufacturing environment. At block 141, a vehicle identification number associated with a user's vehicle is received. The vehicle identification number allows the user to enter the virtual vehicle manufacturing environment. In the example of FIG. 7, parts that are applied to the physical vehicle during actual production are determined and associated with the vehicle identification number of the vehicle that is being produced (block 142). At block 143, the stage is determined based on the parts that have been applied to the physical vehicle. In other embodiments, the parts are not used to determine the stage; rather, the stage is determined in other ways.

Next, at block 144, a virtual representation of the manufacturing environment and the physical vehicle for the present stage of production is generated. The user may move about the virtual vehicle at this stage (or other stages) as described above. At block 145, it is determined whether or not production of the vehicle is completed. If yes, the method moves back to block 142 where the process repeats itself until the vehicle rolled off the assembly line at block 146.

Figure 8:
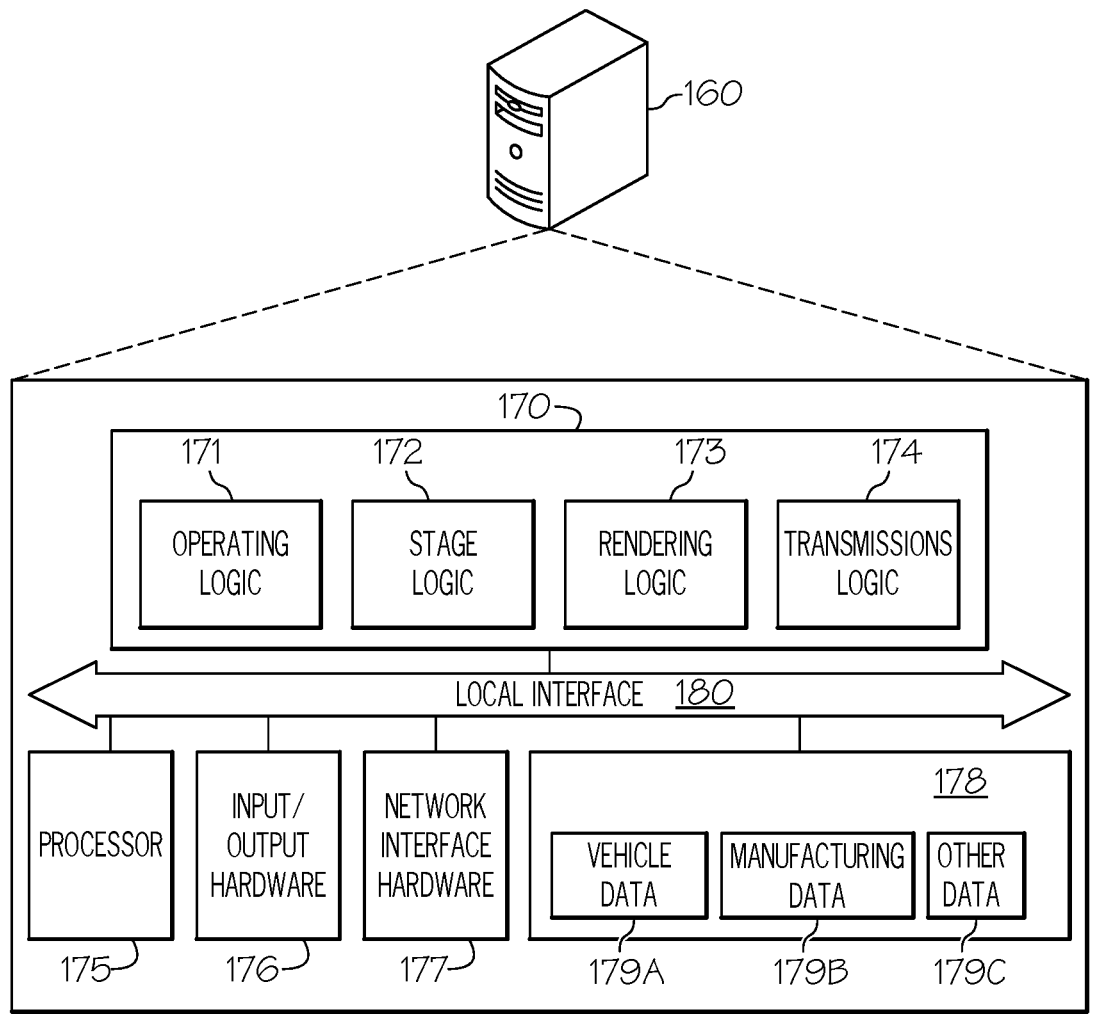
FIG. 8 is an example computing device for generating and presenting a virtual manufacturing environment according to one or more embodiments described and illustrated herein.

Embodiments of the present disclosure may be implemented by a computing device, and may be embodied as computer-readable instructions stored on a non-transitory memory device. Referring now to FIG. 8, an example system for providing a virtual environment as a computing device 160 is schematically illustrated. The example computing device 160 provides a system for generating a virtual manufacturing environment, and/or a non-transitory computer usable medium having computer readable program code for generating a virtual manufacturing environment embodied as hardware, software, and/or firmware, according to embodiments shown and described herein. While in some embodiments, the computing device 160 may be configured as a general purpose computer with the requisite hardware, software, and/or firmware, in some embodiments, the computing device 160 may be configured as a special purpose computer designed specifically for performing the functionality described herein. It should be understood that the software, hardware, and/or firmware components depicted in FIG. 8 may also be provided in other computing devices external to the computing device 160 (e.g., data storage devices, remote server computing devices, and the like).

As also illustrated in FIG. 8, the computing device 160 (or other additional computing devices) may include a processor 175, input/output hardware 176, network interface hardware 177, a data storage component 178 (which may include recorded vehicle data 179A (e.g., data regarding the production state of the vehicle as well as the vehicle model, trim level, and the like), manufacturing data 179B (e.g., data relating to manufacturing process), and any other data 179C for performing the functionalities described herein), and a non-transitory memory component 170. The memory component 170 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 170 may be configured to store operating logic 171, stage logic 172 for determining the stage of production, rendering logic 173 for rendering the virtual vehicle and virtual manufacturing environment, and transmission logic 174 for communicating data to and from display devices of a plurality of users, as described herein (each of which may be embodied as computer readable program code, firmware, or hardware, as an example). It should be understood that the data storage component 178 may reside local to and/or remote from the computing device 160, and may be configured to store one or more pieces of data for access by the computing device 160 and/or other components.

A local interface 180 is also included in FIG. 8 and may be implemented as a bus or other interface to facilitate communication among the components of the computing device 160.

The processor 175 may include any processing component configured to receive and execute computer readable code instructions (such as from the data storage component 178 and/or memory component 170). The input/output hardware 176 may include virtual reality headset, graphics display device, keyboard, mouse, printer, camera, microphone, speaker, touch-screen, and/or other device for receiving, sending, and/or presenting data. The network interface hardware 177 may include any wired or wireless networking hardware, such as a modem, LAN port, wireless fidelity (Wi-Fi) card, WiMax card, mobile communications hardware, and/or other hardware for communicating with other networks and/or devices, such as to communicate with the vehicle sensors and the environment sensors (i.e., a transceiver). The network interface hardware 177 may communicate via the Internet to receive vehicle data provided from one or more sources as well as communicate with a display device, such as virtual reality headset to display the virtual vehicle and virtual environment.

Included in the memory component 170 may be the operating logic 171, stage logic 172, rendering logic 173, and transmission logic 174. The operating logic 171 may include an operating system and/or other software for managing components of the computing device 160. Similarly, the stage logic 172 may reside in the memory component 170 and may be configured to determine the stage of manufacturing of particular vehicles based on production information. The rendering logic 173 also may reside in the memory component 170 and may be configured to render the virtual vehicle and virtual environment for display on display device. The transmission logic 174 includes logic to communicate data to and from a plurality of display devices.

The components illustrated in FIG. 8 are merely exemplary and are not intended to limit the scope of this disclosure. More specifically, while the components in FIG. 8 are illustrated as residing within the computing device 160, this is a non-limiting example. In some embodiments, one or more of the components may reside external to the computing device 160.

It should now be understood that embodiments of the present disclosure are directed systems and methods for generating and displaying virtual vehicles in a virtual manufacturing environment while a corresponding physical vehicle is being built within a physical vehicle manufacturing environment. The user may navigate the virtual manufacturing environment to learn more about his or her vehicle, as well as the manufacturing process. In some embodiments, the user may converse with team members and provide positive feedback within the virtual manufacturing environment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of presenting a virtual manufacturing environment, the method comprising:
   receiving a vehicle identification number of a vehicle being manufactured;
   receiving one or more parts assigned to the vehicle;
   determining a stage of manufacturing for the vehicle based at least in part on the one or more parts;
   generating a virtual representation of the vehicle at the determined stage in a virtual manufacturing environment;
   preparing for display the virtual representation of the vehicle and the virtual manufacturing environment, wherein the virtual representation shows the virtual representation of the vehicle at the determined stage within the virtual assembly line;
   generating and preparing for display a dynamic manufacturing progress indicator, wherein the dynamic manufacturing progress indicator displays a plurality of stages of manufacturing and in response to a user selecting a stage from the plurality of stages of manufacturing, navigating the virtual manufacturing environment to display the virtual representation of the vehicle at the selected stage within the virtual assembly line; and
   receiving inputs from a user input device to move throughout the virtual manufacturing environment and to generate perspectives of the virtual manufacturing environment in accordance with the inputs.

2. The method of claim 1, wherein the virtual representation of the vehicle and the virtual manufacturing environment are prepared for display on a virtual reality headset.

3. The method of claim 1, further comprising:
   receiving an input from a user to request additional information from the manufacturing progress indicator; and
   generating and preparing for display an avatar that provides one or more of visual and audio information regarding the requested additional information.

4. The method of claim 1, wherein the virtual representation of the manufacturing environment comprises a virtual assembly line.

5. The method of claim 1, wherein the one or more parts are received in response to a scanning of a code.

6. The method of claim 1, wherein the one or more parts are received from a wireless tag.

7. The method of claim 1, further comprising:
   generating and preparing for display a feedback option;
   receiving a feedback within the feedback option; and
   transmitting the feedback to an intended recipient.

8. A system for presenting a virtual manufacturing environment, the method comprising:
   one or more processors; and
   a non-transitory computer-readable medium storing instructions that, when executed by the one or more processors, causes the one or more processors to:
   receive a vehicle identification number of a vehicle being manufactured;
   receive one or more parts assigned to the vehicle;
   determine a stage of manufacturing for the vehicle based at least in part on the one or more parts;
   generate a virtual representation of the vehicle at the determined stage in a virtual manufacturing environment;
   prepare for display the virtual representation of the vehicle and the virtual manufacturing environment, wherein the virtual representation shows the virtual representation of the vehicle at the determined stage within the virtual assembly line;
   generate and prepare for display a dynamic manufacturing progress indicator, wherein the dynamic manufacturing progress indicator displays a plurality of stages of manufacturing and in response to selection of a stage from the plurality of stages of manufacturing, navigate the virtual manufacturing environment to display the virtual representation of the vehicle at the selected stage within the virtual assembly line; and
   receive inputs from a user input device to move throughout the virtual manufacturing environment and to generate perspectives of the virtual manufacturing environment in accordance with the inputs.

9. The system of claim 8, wherein the virtual representation of the vehicle and the virtual manufacturing environment are prepared for display on a virtual reality headset.

10. The system of claim 8, wherein the instructions further cause the one or more processors to
    receive an input from a user to request additional information from the manufacturing progress indicator; and
    generate and prepare for display an avatar that provides one or more of visual and audio information regarding the information regarding the requested additional information.

11. The system of claim 8, wherein the virtual representation of the manufacturing environment comprises a virtual assembly line.

12. The system of claim 11, wherein the virtual representation shows the virtual representation of the vehicle at a present stage within the virtual assembly line.

13. The system of claim 8, wherein the one or more parts are received in response to a scanning of a code.

14. The system of claim 8, wherein the one or more parts are received from a wireless tag.

15. The system of claim 8, wherein the instructions further cause the one or more processors to:
    generate and prepare for display a feedback option;
    receive a feedback within the feedback option; and
    transmit the feedback to an intended recipient.

* * * * *

UNITED STATES PATENT AND TRADEMARK OFFICE
CERTIFICATE OF CORRECTION

| | |
|---|---|
| PATENT NO. | : 12,475,609 B2 |
| APPLICATION NO. | : 18/339769 |
| DATED | : November 18, 2025 |
| INVENTOR(S) | : Nick Anthony Megariotis et al. |

It is certified that error appears in the above-identified patent and that said Letters Patent is hereby corrected as shown below:

On the Title Page

Item (73), assignee 2, city, delete "Toyota (JP)" and insert --Toyota-shi Aichi-ken (JP)--, therefor.

In the Specification

In Column 1, Line(s) 19, before "not", insert --may--.

In Column 2, Line(s) 41, delete "complements the" and insert --compliments to the--, therefor.

In Column 3, Line(s) 2, after "as well as", delete "the".

In Column 3, Line(s) 11, delete "received" and insert --receives--, therefor.

In Column 3, Line(s) 62, delete "build" and insert --built--, therefor.

In Column 4, Line(s) 1, after "example", insert --,--.

In Column 4, Line(s) 19, delete "of" and insert --for--, therefor.

In Column 4, Line(s) 46, after "team", insert --member--.

In Column 6, Line(s) 41, after "directed", insert --to--.

In the Claims

In Column 8, Line(s) 37, Claim 10, before "the requested", delete "the information regarding".

Signed and Sealed this
Thirteenth Day of January, 2026

John A. Squires
*Director of the United States Patent and Trademark Office*